US007792917B2

(12) United States Patent
Gunda et al.

(10) Patent No.: US 7,792,917 B2
(45) Date of Patent: Sep. 7, 2010

(54) MULTIPLE NETWORK SHARED DISK SERVERS

(75) Inventors: Kalyan C. Gunda, Wappingers Falls, NY (US); Gautam Haridas Shah, Shrewsbury, MA (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 11/970,379

(22) Filed: Jan. 7, 2008

(65) Prior Publication Data

US 2009/0177756 A1    Jul. 9, 2009

(51) Int. Cl.
*G06F 15/167* (2006.01)
(52) U.S. Cl. ...................... 709/216; 709/213
(58) Field of Classification Search ............ 709/216, 709/213
See application file for complete search history.

(56) References Cited

U.S. PATENT DOCUMENTS

| | | | |
|---|---|---|---|
| 6,944,785 B2 * | 9/2005 | Gadir et al. ............... | 714/4 |
| 7,058,727 B2 | 6/2006 | Dingsor et al. | |
| 7,177,897 B2 | 2/2007 | Manukyan | |
| 2002/0007410 A1 | 1/2002 | Seagren et al. | |
| 2004/0250248 A1 | 12/2004 | Halpern et al. | |
| 2005/0005006 A1 | 1/2005 | Chauffour et al. | |
| 2006/0026161 A1 | 2/2006 | Henseler | |

OTHER PUBLICATIONS

Authors: Frank B. Schmuck; Roger L. Haskin Title: GPFS: A Shared-Disk File System for Large Computing Clusters Source: Proceedings of the Conference on File and Storage Technologies table of contents; pp. 231-244 Year of Publication: 2002; ISBN:1-880446-03-0 Published: USENIX, Berkley, CA.*
General Parallel File System: Advanced Administration Guide, Version 3.1, IBM, pp. 1-138.

* cited by examiner

*Primary Examiner*—Ramy M Osman
*Assistant Examiner*—Marshall McLeod
(74) *Attorney, Agent, or Firm*—Stephen Bongini; Fleit Gibbons Gutman Bongini & Bianco PL

(57) ABSTRACT

A method, information processing system, and computer program storage product access data on an information processing system. The information processing system includes a plurality of Network Shared Disk servers and at least one set of Network Shared Disks. Each of the Network Shared Disks is served by at least one of the Network Shared Disk servers. Configuration data that includes information indicating which of the Network Shared Disk servers serve each of the Network Shared Disks is analyzed. The Network Shared Disk to be accessed is identified. One of the Network Shared Disk servers is selected from the plurality of Network Shared Disk servers that serve the one Network Shared Disk to be accessed. The one Network Shared Disk to be accessed is accessed via the one Network Shared Disk server that was selected.

19 Claims, 5 Drawing Sheets

MULTIPLE NETWORK SHARED DISK SERVERS

FIELD OF THE INVENTION

The present invention generally relates to file systems, and more particularly relates to servicing I/O requests in a system with I/O servers and multiple networks that provide access to storage devices.

BACKGROUND OF THE INVENTION

Existing versions of the General Parallel File System ("GPFS") allow up to two nodes to be designated as Network Storage Disk ("NSD") servers for any given LUN/NSD (Logical Unit Number/Network Storage Disk). Currently, if a single NSD server is defined, it is designated as the primary NSD server. If two servers are defined, the first server in the list is designated as the primary NSD server and the other server is designated as the backup NSD server. The primary NSD server is responsible for performing input-output ("I/O") and associated data transfer over a designated (global) GPFS network to any GPFS client that does not have local access to the NSD. By default, the data transfer from an active NSD server to any NSD client takes place over the global GPFS network used to define the GPFS cluster.

Recently, GPFS introduced the "subnet" function. With the "subnet" function, some clients that are connected to the NSD server via a high speed network have data transferred over this high-speed network rather than over the global GPFS network. One limitation with current GPFS implementations is that only one NSD server can access the NSD at a time. For example, if one NSD server is designated as a primary server another server such as the designated backup server cannot serve the NSD unless the primary server fails. Stated differently, there is only a single NSD server that performs I/O with respect to a given NSD on behalf of all clients that do not have local access to the given NSD server. Allowing only one NSD server to access the NSD can be inefficient in terms of performance with respect to load balancing, network partitioning, workload partitioning, etc.

SUMMARY OF THE INVENTION

Briefly, in accordance with the present invention, disclosed are a method, system, and computer program storage product for accessing data on an information processing system. The information processing system includes a plurality of Network Shared Disk servers and at least one set of Network Shared Disks. Each of the Network Shared Disks is served by at least one of the Network Shared Disk servers. The method includes analyzing configuration data that includes information indicating which of the Network Shared Disk servers serve each of the Network Shared Disks. The Network Shared Disk to be accessed is identified. One of the Network Shared Disk servers is selected from the plurality of Network Shared Disk servers that serve the one Network Shared Disk to be accessed. The one Network Shared Disk to be accessed is accessed via the one Network Shared Disk server that was selected.

In another embodiment, an information processing system for accessing data on an information processing system is disclosed. The information processing system includes a plurality of Network Shared Disk servers and at least one set of Network Shared Disks. Each of the Network Shared Disks is served by at least one of the Network Shared Disk servers. The information processing system includes a memory and a processor that is communicatively coupled to the memory. The information processing system also includes a data access manager that is communicatively coupled to the memory and the processor. The data access manager is adapted to analyze configuration data that includes information indicating which of the Network Shared Disk servers serve each of the Network Shared Disks. The Network Shared Disk to be accessed is identified. One of the Network Shared Disk servers is selected from the plurality of Network Shared Disk servers that serve the one Network Shared Disk to be accessed. The one Network Shared Disk to be accessed is accessed via the one Network Shared Disk server that was selected.

In yet another embodiment, a computer program storage product for accessing data on another information processing system is disclosed. The information processing system includes a plurality of Network Shared Disk servers and at least one set of Network Shared Disks. Each of the Network Shared Disks is served by at least one of the Network Shared Disk servers. The computer program storage product includes instructions for analyzing configuration data that includes information indicating which of the Network Shared Disk servers serve each of the Network Shared Disks. The Network Shared Disk to be accessed is identified. One of the Network Shared Disk servers is selected from the plurality of Network Shared Disk servers that serve the one Network Shared Disk to be accessed. The one Network Shared Disk to be accessed is accessed via the one Network Shared Disk server that was selected.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION

Embodiments of the present invention allow multiple Network Storage Disk ("NSD") servers to "simultaneously" access a given Logical Unit Number ("LUN") 112. Therefore, each NSD client is able to select which NSD server to use for obtaining data from a given LUN. This can be configured to control load balance across the server(s) serving the same set of LUN, control network partitioning by balancing loads on different networks, and control workload partitioning for the system.

System Overview

Figure 1:
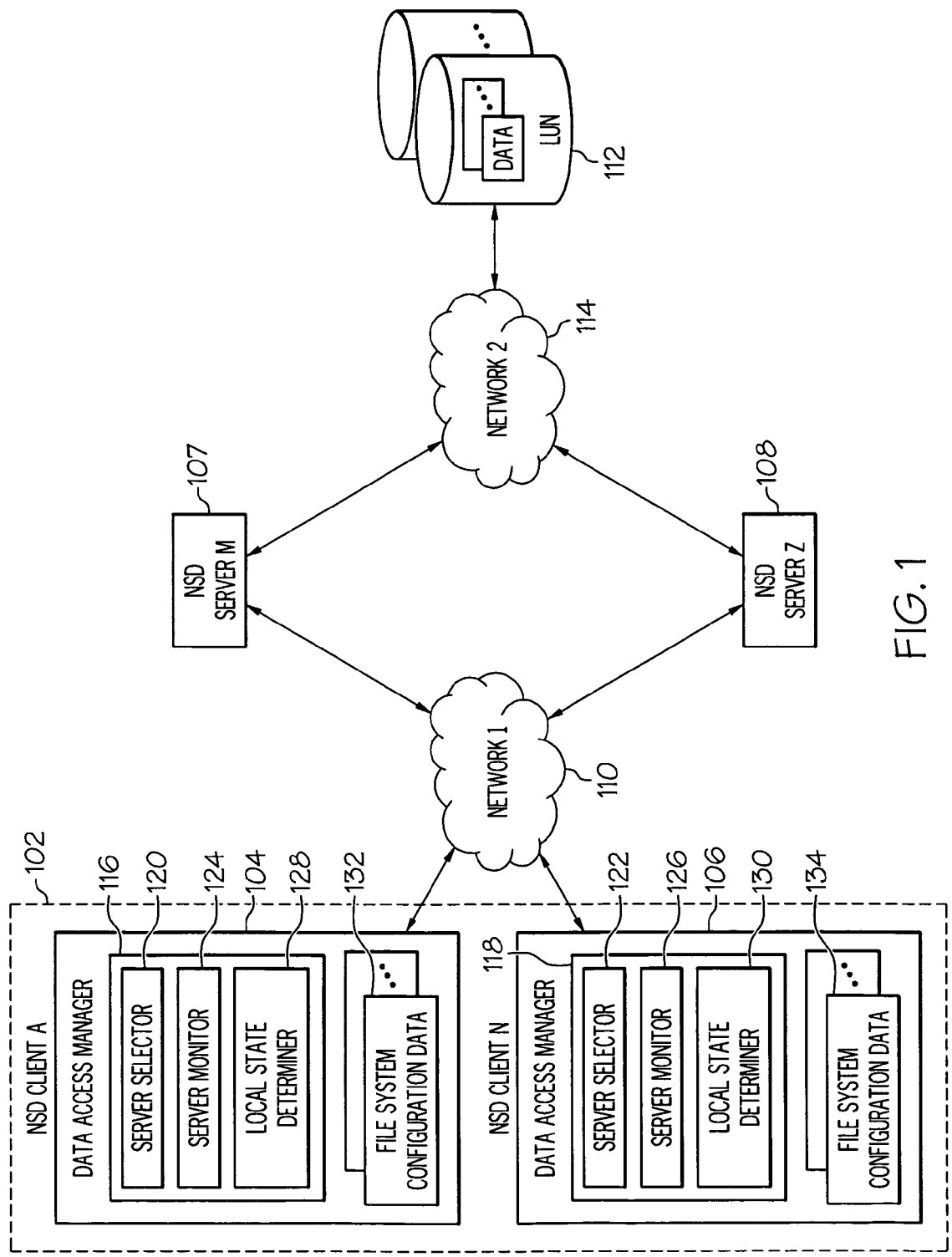
FIG. 1 is a block diagram illustrating an operating environment in accordance with one embodiment of the present invention.

FIG. 1 illustrates an exemplary operating environment for providing multiple NSD server access to a given LUN/NSD in according with an embodiment of the present invention. As shown, a cluster 102 of computing nodes 104 and 106 is provided in a parallel file system operating environment. In this embodiment, the parallel file system operating environment is a GPFS environment. GPFS provides concurrent high-speed file access to applications executing on multiple nodes in various types of clusters such as an AIX cluster, a Linux cluster, or a heterogeneous cluster of AIX and Linux nodes. A more detailed discussion of GPFS can be found at (http://publib.boulder.ibm.com/infocenter/clresctr/vxrx/index.jsp?topic=/com.ibm.cluster.gpfs.doc/gpfsbooks.html) and in "GPFS: A Shared-Disk File System for Large Computing Clusters Source" authored by Frank B. Schmuck & Roger L. Haskin appearing in the Proceedings of the Conference on File and Storage Technologies, Pages: 231-244, Year of Publication: 2002, ISBN:1-880446-03-0, both of which are hereby incorporated by reference in their entirety.

The operating environment also includes multiple computing nodes 107 and 108. In this embodiment, the computing nodes 104 and 106 are communicatively coupled to one another and to the computing nodes 107 and 108 via a suitable communication mechanism 110, such as a high-capacity switch or network (typically a network that supports the TCP/IP stack). The computing nodes 107 and 108 are communicatively coupled to one or more LUNs 112 via another network 114, such as a fiber channel Storage Area Network ("SAN"). The LUN 112, in this embodiment, includes one or more disks (hardware or software raid) that are presented as one logical entity by storage hardware and/or operating systems.

As shown in FIG. 1, the computing nodes 107 and 108 have local access to the LUN 112 via network_2 114 (e.g., a SAN network). It should be noted that the disks within the LUN 112 are not required to be connected via a common network such as network_2 114 to multiple servers. For example, one or more of the disks within the LUN 112 can be communicatively coupled to multiple servers via separate/independent. In a configuration in which all of the computing nodes have local access to the LUN 112 (such as via connectivity to network_2 114), data used by applications flows over the SAN 114 and control information flows among the GPFS instances in the cluster 102 over network_1 110 (e.g., a Local Area Network, or LAN). However, in some environments, every node in the cluster is not able to be communicatively coupled to the SAN 114. This is the case with respect to the client processing nodes 104 and 106 of FIG. 1. Therefore, the GPFS environment makes use of a network block device capability. For example, GPFS provides a block level interface over the LAN 110, referred to as "Network Shared Disk".

GPFS clusters use NSD to provide high speed data access to applications running on LAN-attached nodes, such as processing nodes 104 and 106. In this configuration, disks are (SAN) attached only to the NSD servers. However, it should be noted that the present invention is not limited to a SAN configuration and other configurations such as (but not limited to) direct connection to the NSD servers and zone configurations can also be used. Each NSD server is attached to all or a portion of the disk collection. In conventional GPFS environments, data from a particular LUN is served to these client nodes from a single NSD server. Stated differently, a single NSD server services all subnets of LAN-attached nodes.

However, in embodiments of the present invention, a subset of the total node population is defined as NSD server nodes. In other words, multiple NSD severs can access a particular LUN to provide data to the LAN-attached computing nodes. The NSD Servers are responsible for the abstraction of disk data blocks across an IP-based network, such as the LAN.

FIG. 1 shows an exemplary configuration in which the processing nodes 104 and 106 are connected to multiple NSD servers 107 and 108 using a high-speed interconnect or an IP-based network 110 (such as Ethernet). In this example, data to the NSD servers 107 and 108 flows over the SAN 114 and both data and control information to the clients flow across the LAN 110. Thus, the processing nodes 104 and 106 are referred as "NSD clients" 104 and 106.

This configuration allows multiple NSD servers to "simultaneously" access a given LUN. Therefore, each of the NSD clients 104 and 106 are able to select which NSD server 107 and 108 to use for obtaining data from the LUN 112. In this embodiment, each of the NSD clients 104 and 106 has a data access manager 116 and 118 for managing NSD server selection and data retrieval. The data access manager 116 and 118 includes a server selector 120 and 122, a server monitor 124 and 126, and a local state determiner 128 and 130. These components analyze file system configuration data 132 and 134 for selecting an NSD server 107 and 108 to obtain data from the LUN 112.

Multiple NSD Server Access for a Given LUN

Figure 2:
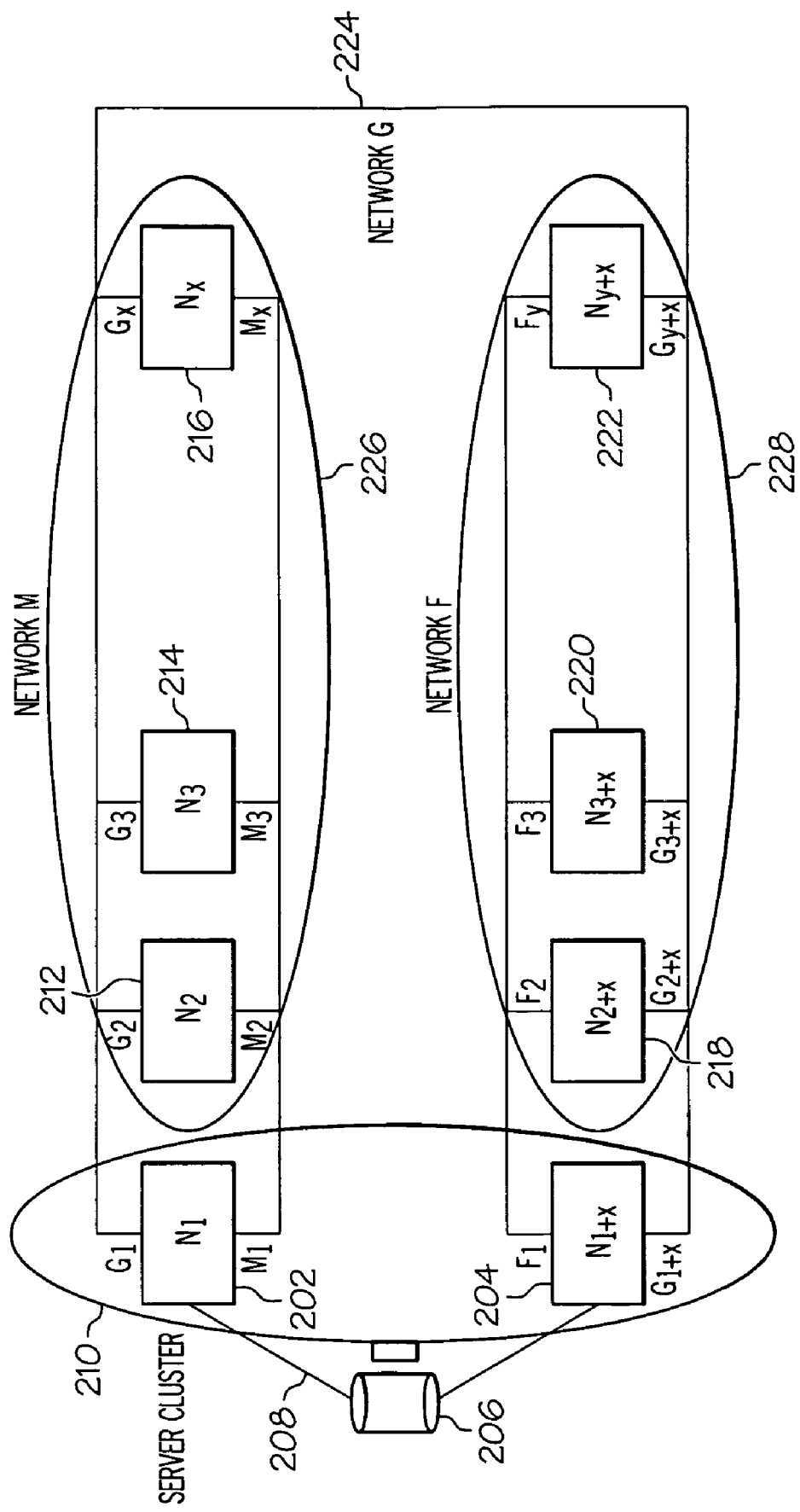
FIG. 2 is a block diagram illustrating another operating environment in accordance with an embodiment of the present invention.

FIG. 2 shows another exemplary GPFS environment. As shown, multiple processing nodes N1 202 and N1+X 204 are communicatively coupled to a LUN 206, such as a SAN network. As discussed above, the processing nodes can be directly connected to a LUN. For example, processing node N1 202 is directly connected to the LUN 206 via a direct connection 208. The NSD servers 202 and 204 make up a server cluster 210. Multiple processing nodes, such as nodes N2 212, N3 214, Nx 216, N2+x 218, N3+x 220, and Ny+x 222, are designated as NSD clients. The NSD servers 202 and 204 and the NSD clients 212 to 222 are part of Network G 224. In this embodiment, NSD clients N2, N3, and Nx are part of sub-network M 226, and NSD clients N2+x, N3+x, and Ny+x are part of sub-network F 228.

The GPFS configuration of FIG. 2 allows multiple NSD servers 202 and 204 to simultaneously service I/O requests from different clients 212-222. Having multiple NSD servers 202 and 204 servicing I/O requests from different clients 212-222 can control load balancing on the server, better network partitioning by balancing loads on different networks and reducing load on Network 224, and control file system server workload partitioning for the system. In this embodiment, the NSD clients 212-222 are partitioned to the NSD servers 202 and 204.

The partitioning of this embodiment is based on factors that the system operator is trying to optimize, such as allowing a high speed interconnection to be used by both the NSD servers 202 and 204 and the clients 2122-222. Therefore, data is transferred over this high speed interconnect rather than a global GPFS network. Partitioning NSD clients 212-222 can also be based on optimizing direct low bandwidth requests to a server with lower capacity, or directing a specific file system request to a particular NSD server 202 and 204.

In this embodiment, primary and secondary NSD sever configurations such as those used in conventional GPFS environments are not used. Instead, a list of NSD servers and a mechanism for an NSD client to choose a particular NSD server are provided. In this example, the data access manager 116, via the server selector 120, allows an NSD client such as NSD client N2 to select which of the NSD servers 202 and 204 to use for obtaining data from the LUN 206. The file system configuration data 132 that is made available to the NSD clients 212-222 identifies, among other things, the subnets and their nodes/servers, the NSD servers and the LUNs they manage, and the file systems (this information can identify the LUNs that make up a file system).

The file system configuration data 132 of this embodiment also includes information that indicates which NSD servers are to be used to access a particular file system. File system configuration data 132 is not limited to residing at each node. In further embodiments, the file system configuration data 132 resides at one or a subset of the nodes and is shared among the other nodes. The file system configuration data 132 can also reside on a remote information processing unit.

Figure 3:
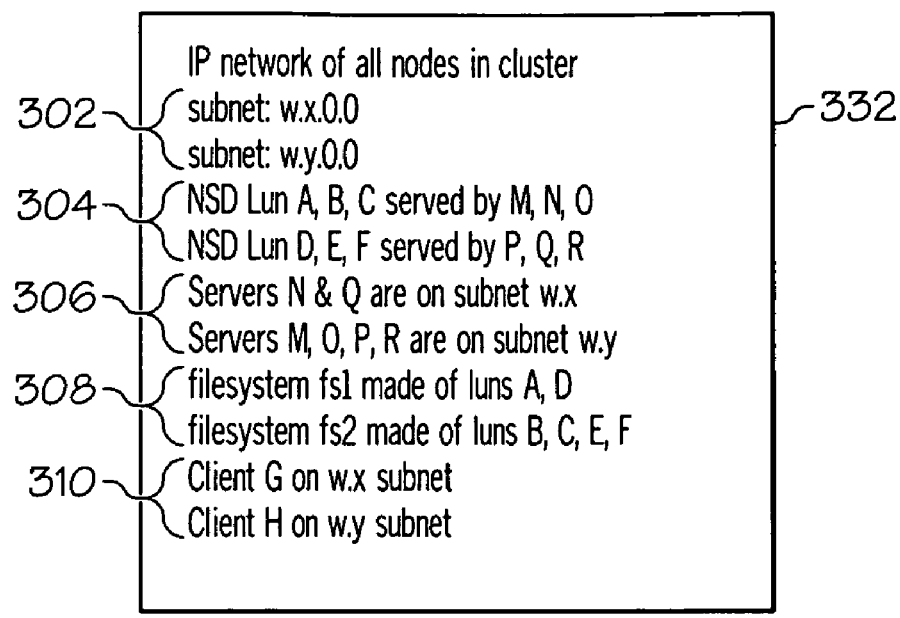
FIGS. 3 and 4 show exemplary system configuration data according to one embodiment of the present invention.
Figure 4:
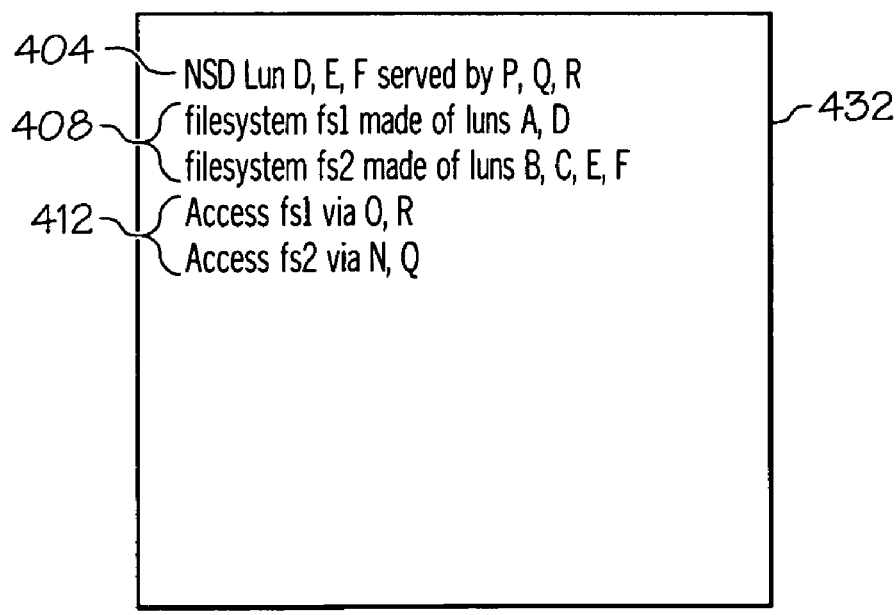

FIGS. 3 and 4 show exemplary file system configuration data according to an embodiment of the present invention. In FIG. 3, an administrator has created a GPFS cluster and has created the file system configuration data 332 associated with that cluster. The file system configuration data 332 of FIG. 3 includes subnet data 302, NSD LUN data 304, Server data 306, file system data 308, and client data 310. The subnet data 302 includes the subnet address information such as w.x.0.0 and w.y.0.0. The NSD LUN data 304 identifies LUNs that are served by a set of NSD servers. For example, the file system configuration data 332 of FIG. 3 shows that NSD LUNs A, B, and C are served by NSD servers M, N, and O and that NSD LUNs D, E, and F are served by NSD servers P, Q, and R. This data allows an NSD client to select an appropriate NSD server, via the server selector 120, when requesting data from a particular LUN.

The file system data 308 indicates the LUNs that make up a particular file system, such as LUNs A and D that make up file system 1. The client data 310 indicates the subnet that a particular client is on. This allows an NSD client, such as NSD client 104, to determine the subnet to which it belongs. For example, the local state determiner 128 of the data access manager 116 can analyze the file system configuration data 332 and determine that it is on subnet w.x.0.0.

The file system configuration data 432 of FIG. 4 includes NSD LUN data 404, file system data 408, and access data 412. The NSD LUN data 404 and the file system data 408 are similar to that discussed above with respect to FIG. 3. The access data 412 indicates the NSD servers that are to be used for each file system. For example, the file system configuration data 432 of FIG. 4 shows that NSD servers 0 and R are to be selected when requesting access from file system fs1. The file system configuration data shown in FIGS. 3 and 4 is meant to be exemplary, and is not meant to limit the present invention to any particular type or format of system configuration data.

Returning to FIG. 2, node N1 is connected through a high speed switch 208 such as a federation switch to disk D 206. Another set of nodes is connected to a Myrinet network, which is a high-speed interconnect network. One node, namely N1+x 204, in this set of nodes connected to the Myrinet network is also connected to the disk D 206. All nodes are connected to each other by the Gigabit Ethernet network 224. In conventional GPFS systems, one of the nodes N1 and N1+x is defined as the primary and the common network (assuming the federation and Myrinet addresses are local subnets because a node generally cannot communicate from a given Myrinet address to the given federation address) is the Gigabit Ethernet network 224. In this conventional example, N1 is designated as the primary NSD server. Assuming the administrator configures the subnet option, all nodes in the federation network can access the data from LUN D 206 connected to N1 via federation. However, all nodes in the Myrinet cluster, except node N1+x, have to access N1 via the Gigabit Ethernet network 224. Any access from N2 is handled locally since it has a "direct" link to the LUN D 206.

In the above conventional example, all of the nodes except N1+x when they need data from the LUN D 206, they are generally required to obtain it via a single NSD server, N1 202. This can be inefficient and can cause various problems with respect to load balancing, network partitioning, and workload partitioning. Therefore, in this embodiment of the present invention, multiple processing nodes, such as N1 and N1+x, are designated as NSD servers for disk D 206. In other words, each of the NSD servers N1 and N1+x can access the disk D 206 on behalf of one or more NSD clients 212-222. In this example, N1+x can serve I/O to all nodes connected to the Myrinet network, so as to provide better bandwidth and also reduce traffic congestion on the common gigabit Ethernet network 224.

As explained above, an administrator creates the file system configuration data 132 and makes it available to the NSD clients 212-222. The data access manager 116 of an NSD node, via the local state determiner 128, analyzes the file system configuration data 132 and determines its subnet. The server selector 116 of the data access manager 116 then identifies the list of NSD servers associated with the LUN or file system to be accessed. For example, NSD client N2+x determines that it is in subnet F. If this NSD client N2+X is trying to obtain data from disk D 206, it analyzes the file system configuration data 132 to determine the NSD servers associated with disk D 206. In this example, the NSD client N2+X determines that NSD servers N1 and N1+x are associated with disk D 206.

The data access manager 116 further analyzes the file system configuration data 132 to determine which NSD servers are associated with subnet F (the subnet of NSD client N2+x). In this example, the data access manager 116 identifies NSD server 204 as part of subnet F 228. Therefore, the server selector 120 selects NSD server N1+x for obtaining data from disk D. If more than one NSD server is given for subnet F 228, the sever selector 120 of this embodiment selects the first NSD server on the list and proceeds sequentially through the list if a previously selected NSD server is not available. This enables load balancing on servers by distributing primaries among nodes.

Subsequent I/Os use the NSD server that was initially selected. However, additional servers can also join the subnet over time. In this situation, in this embodiment the server monitor 124 of the data access manager 116 detects that a new server has joined the subnet. The server selector 120 determines if the new server has a higher priority than the currently chosen server. If the new server does have a higher priority, the server selector 120 selects the new server to interact with the disk D 206.

Further, if a selected server fails, a new server is selected in a manner similar to selecting the initial sever. In this embodiment, the failed server is not excluded from the selection process. However, if an I/O transaction fails due to a disk failure, a new server is selected from the server list and the failed server is excluded. An I/O is designated as failed in this embodiment only after all of the servers in the server list have been considered for selection.

The preferred server will not always be up (i.e., part of the GPFS group when the client first performs the selection process). Therefore, to ensure that a preferred NSD server or an NSD server with the highest priority is selected when it becomes available, in this embodiment an NSD client performs the selection process when any defined NSD server joins the subnet with a higher join sequence number than the currently selected NSD server. The client server can also perform the selection process for every I/O as well.

In conventional GPFS systems, if the path to the disk is broken on the primary NSD server, the backup NSD server serves the disk. After the path to the disk on the primary NSD server is fixed, the backup NSD server serves the disk. If the path to the disk on the NSD backup server fails, the I/O is failed even though the primary server's path to the disk is fixed. This occurs because in conventional systems there generally is not any way (without recycling the daemon) to drive the primary NSD sever to rediscover its path and takeover as the active server from the backup server.

However, in this embodiment of the present invention, an administrator command can be invoked when a path is fixed. For example, a command such as mmnsddiscover -d <diskName ALL>-s <nnode-NameList>-c can be invoked on either a server or a client. With respect to a server, this command invokes a process that drives all the specified nodes to rediscover a path for the NSDs that is specified (the command above specifies all NSDs). This allows all NSD servers to rediscover access. With respect to an NSD client, the process drives the daemon to re-choose the server for the given nsds on all nodes on which it is invoked with the "-c" option. The command on the client side is limited to the nodes within the cluster as the node might not have access to all remote clients. However, a remote cluster administrator can similarly drive the rediscovery of the NSD servers for any remote clients that need to re-choose servers.

The present invention, however, is not limited to the above-described process for re-choosing an NSD server. For example, in another embodiment after the paths are rediscovered an RPC can be broadcasted to all the nodes (local and remote) that have joined the cluster. An RPC handler drives the NSD client to re-choose the server. In yet another embodiment, a new server can be selected after a given period of time passes.

Accordingly, embodiments of the present invention allow multiple NSD servers to serve I/O requests to a particular LUN. This provides more control for load balancing on the server, network partitioning by balancing loads on different networks, and workload partitioning for the system.

Operational Flow for Multiple NSD Server Access for a Given LUN

Figure 5:
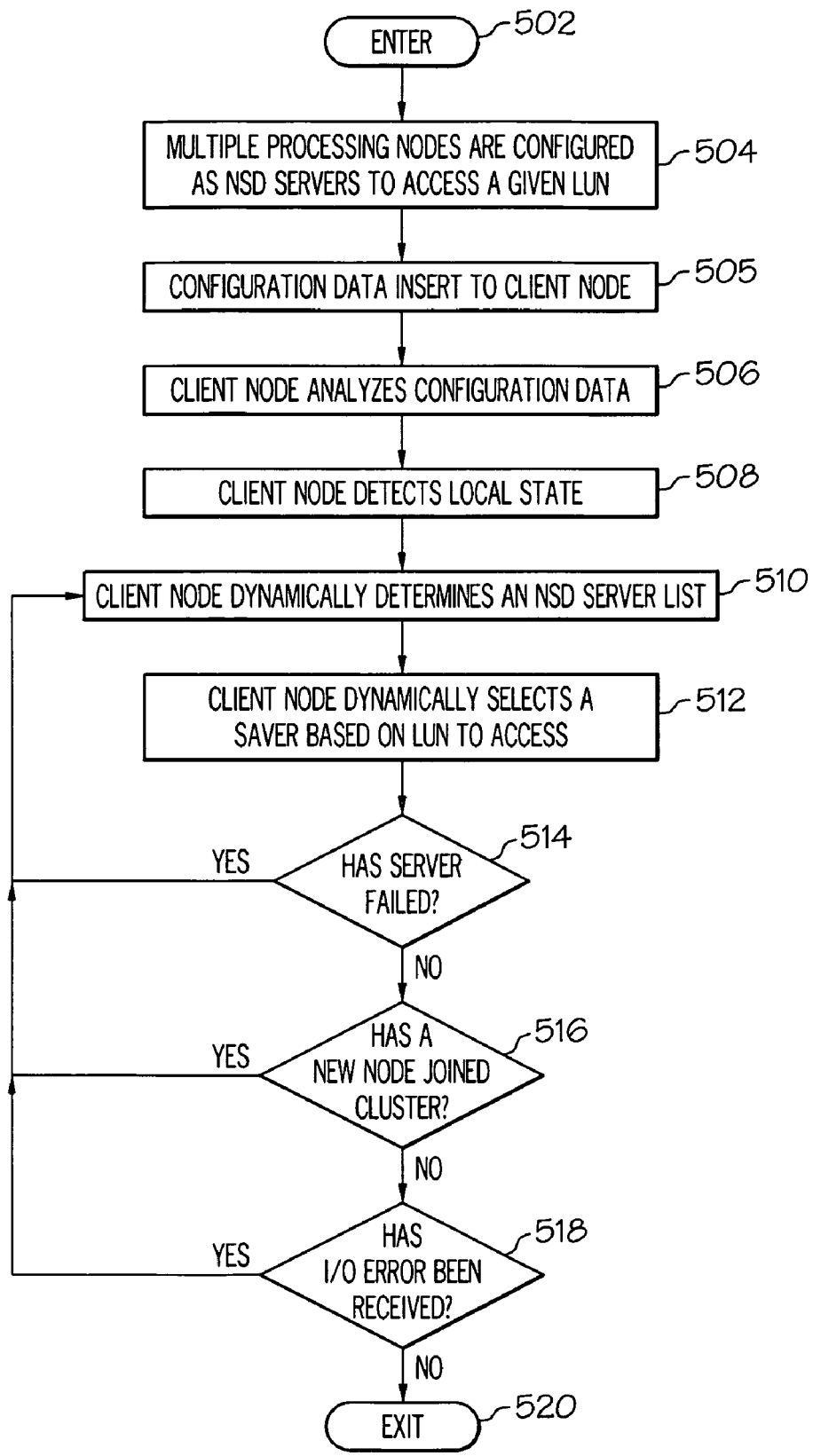
FIG. 5 is an operational flow diagram illustrating a process for providing multiple NSD server access for a given LUN according to one embodiment of the present invention.

FIG. 5 is an operational flow diagram illustrating a process for providing multiple NSD server access for a given LUN according to one embodiment of the present invention. The operational flow diagram begins at step 502 and flows directly to step 504. Multiple processing nodes 107 and 108, at step 504, are configured as NSD servers for multiple accesses to a given LUN 108. Configuration data (for example, that shown in FIGS. 3 and 4), at step 506, is sent to the client nodes 104 and 106. The data access manager 116 and 118 at the client node 104 and 106, at step 506, analyzes the configuration data.

The client node 104 and 106, at step 508, determines its local state. For example, the client node 104 and 106 determines, among other things, the subnet with which it is associated. The client node 104 and 106, via its data access manager 116 and 118, at step 510, dynamically determines an NSD server list. For example, the client node 104 and 106 determines the NSD servers on its subnet and the NSD servers associated with the LUN that it wants to access. The client node 104 and 106, at step 512, dynamically selects an NSD server from the determined server list for obtaining data from the LUN 108.

The client node 104 and 106, at step 514, determines if the selected NSD server has failed. If the result of this determination is positive, the control flow returns to step 510 and a new server list is dynamically determined. If the result of this determination is negative, the client node 104 and 106, at step 516, determines if a new NSD server has joined the cluster. For example, the client node 104 and 106 determines if a new server has joined that has a higher priority than the other servers in the list. If the result of this determination is positive, the control flow returns to step 510 and the client node 104 and 106 dynamically determines a new server list. If the result of this determination is negative, the client node 104 and 106, at step 518, determines if an I/O error has been received. If the result of this determination is positive, the control flow returns to step 510. If the result of this determination is negative, the control flow exits.

Information Processing System

Figure 6:
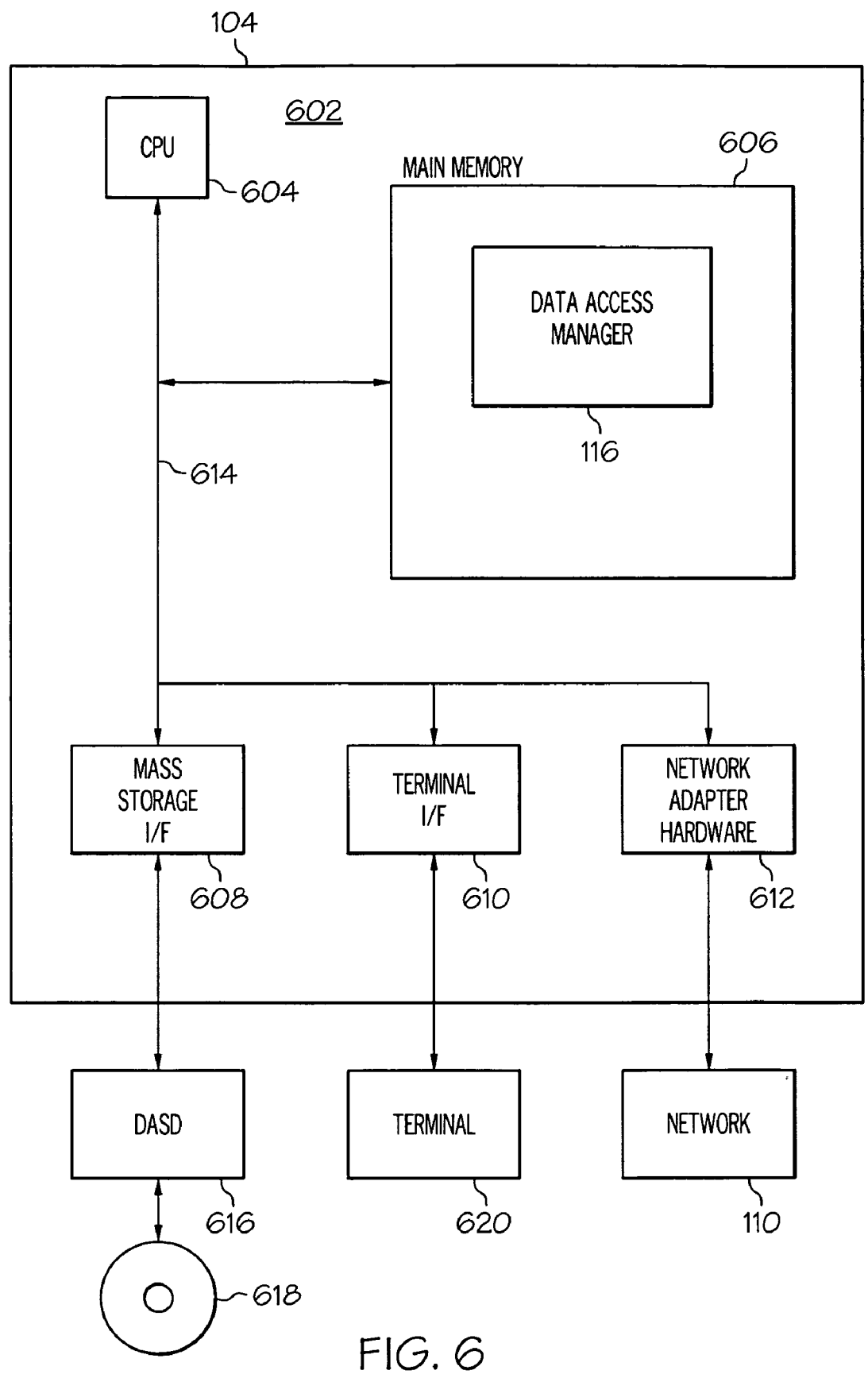
FIG. 6 is a block diagram illustrating an information processing system in accordance with one embodiment of the present invention.

FIG. 6 is a block diagram illustrating an information processing system according to an embodiment of the present invention. The information processing system is a suitably configured processing system adapted to implement an embodiment of the present invention. Any suitably configured processing system is able to be used in embodiments of the present invention, such as a personal computer, workstation, or the like.

The illustrated information processing system 104 includes a computer 602. The computer 602 has a processor 604 that is connected to a main memory 606, a mass storage interface 608, a terminal interface 610, and network adapter hardware 612. A system bus 614 interconnects these system components. The mass storage interface 608 is used to connect mass storage devices, such as data storage device 616, to the information processing system 104. One specific type of data storage device is a disk drive that can store data to and read data from a computer readable medium, such as an optical disk 618 or a magnetic disk.

The main memory 606, in this embodiment, includes a data access manager 116 and its components and file system configuration data 132. Although illustrated as concurrently resident in the main memory 606, components are not required to be completely resident in the main memory 606 at all times or even at the same time. In this embodiment, the information processing system 104 utilizes conventional virtual addressing mechanisms to allow programs to behave as if they have access to a large, single storage entity, referred to as computer system memory, instead of access to multiple, smaller storage entities such as the main memory 606 and data storage device 616. The term "computer system memory" thus generically refers to the entire virtual memory of the information processing system 104.

Although only one CPU 604 is illustrated for computer 602, computer systems with multiple CPUs can be used equally effectively. This embodiment of the present invention further incorporates interfaces that each includes separate, fully programmed microprocessors that are used to off-load processing from the CPU 604. Terminal interface 610 is used to directly connect one or more terminals 620 to computer 602 to provide a user interface to the computer 602. These terminals 620, which are able to be non-intelligent or fully programmable workstations, are used to allow system administrators and users to communicate with the information processing system 104. The terminal 620 is also able to be a user interface and peripheral devices that are connected to computer 602 and controlled by terminal interface hardware included in the terminal interface 610 that includes video adapters and interfaces for keyboards, pointing devices, and the like.

An operating system is included in the main memory, and is preferably a suitable multitasking operating system. However, further embodiments of the present invention use any other suitable operating system. Some embodiments of the present invention utilize architectures, such as an object oriented framework mechanism, that allows instructions of the components of operating system to be executed on any processor located within the information processing system 104. The network adapter hardware 612 is used to provide an interface to a network 110. Embodiments of the present invention are able to be adapted to work with any data communications connections including present day analog and/or digital techniques or via a future networking mechanism.

Although this exemplary embodiment of the present invention is described in the context of a fully functional computer system, further embodiments are capable of being distributed as a program product via a tangible computer readable medium such as a CD, DVD, diskette, flash memory device, or other form of recordable media, or via any type of electronic transmission mechanism.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for accessing data on an information processing system, the information processing system including a plurality of Network Shared Disk servers and at least one set of Network Shared Disks, and each of the Network Shared Disks being served by at least one of the Network Shared Disk servers, the method comprising the steps of:
   analyzing a set of configuration data that includes information indicating which of the Network Shared Disk servers serve each of the Network Shared Disks;
   identifying which one of the Network Shared Disks is to be accessed;
   selecting one of the Network Shared Disk servers from the plurality of Network Shared Disk servers that serve the one Network Shared Disk to be accessed; and
   accessing the one Network Shared Disk to be accessed via the one Network Shared Disk server that was selected.

2. The method of claim 1, wherein the selecting step comprises:
   determining a subnet that a client is on, wherein the client resides within one of a cluster comprising at least one Network Shared Disk server and a remote cluster at a remote location;
   determining, from the set of configuration data, which of the Network Shared Disk servers are on the subnet; and
   selecting one of the Network Shared Disk servers from the Network Shared Disk servers that are determined to be on the subnet.

3. The method of claim 1, wherein the selecting step comprises using priority ranking of the Network Shared Disk servers to select one of the Network Shared Disk servers from the plurality of Network Shared Disk servers that serve the one Network Shared Disk to be accessed.

4. The method of claim 1, further comprising the steps of:
   determining if the one Network Shared Disk server that was selected has failed or an I/O transaction has failed; and
   if it is determined that the one Network Shared Disk server that was selected has failed or an I/O transaction has failed, selecting another of the Network Shared Disk servers from the plurality of Network Shared Disk servers that serve the one Network Shared Disk to be accessed using the priority ranking.

5. The method of claim 1, further comprising the steps of:
   determining if a new Network Shared Disk server has joined the information processing system; and
   if it is determined that a new Network Shared Disk server has joined the information processing system, repeating the selecting step.

6. The method of claim 1, wherein the Network Shared Disk servers reside within a General Parallel File System.

7. The method of claim 1, wherein the set of configuration data further includes at least one of:
   a subnet address for each of the Network Shared Disk servers,
   a set of file system Network Shared Disk information indicating a set of Network Shared Disks associated with a particular file system, and
   a file system access indicator indicating a set of Network Shared Disk servers that are to be used when accessing a particular file system.

8. An information processing system for accessing data on another information processing system that includes a plurality of Network Shared Disk servers and at least one set of Network Shared Disks, each of the Network Shared Disks being served by at least one of the Network Shared Disk servers, the information processing system comprising:
   a memory;
   a processor communicatively coupled to the memory; and
   a data access manager communicatively coupled to the memory and the processor, wherein the data access manager is adapted to:
      analyze a set of file system configuration data that includes information indicating which of the Network Shared Disk servers serve each of the Network Shared Disks;
      identify which one of the Network Shared Disks is to be accessed;
      select one of the Network Shared Disk servers from the plurality of Network Shared Disk servers that serve the one Network Shared Disk to be accessed; and
      access the one Network Shared Disk to be accessed via the one Network Shared Disk server that was selected,
   wherein the data access manager is further adapted to select by:
      determining a subnet that a client is on;
      determining, from the set of file system configuration data, which of the Network Shared Disk servers are on the subnet; and
      selecting one of the Network Shared Disk servers from the Network Shared Disk servers that are determined to be on the subnet.

9. The information processing system of claim 8, wherein the data access manager is further adapted to:
   determine if the one Network Shared Disk server that was selected has failed or an I/O transaction has failed; and
   if it is determined that the one Network Shared Disk server that was selected has failed or an I/O transaction has failed, the data access manager is further adapted to select another of the Network Shared Disk servers from the plurality of Network Shared Disk servers that serve the one Network Shared Disk to be accessed.

10. The information processing system of claim 8, wherein the data access manager is further adapted to:
   determine if a new Network Shared Disk server has joined the information processing system; and
   if it is determined that a new Network Shared Disk server has joined the information processing system, the data access manager is further adapted to repeat selection one of the Network Shared Disk servers from the plurality of Network Shared Disk servers that serve the one Network Shared Disk to be accessed.

11. The information processing system of claim 8, where the data access manager is further adapted to select by:
   using priority ranking of the Network Shared Disk servers to select one of the Network Shared Disk servers from the plurality of Network Shared Disk servers that serve the one Network Shared Disk to be accessed.

12. The information processing system of claim 8, wherein the set of file system configuration data further includes at least one of:
   a subnet address for each of the Network Shared Disk servers;
   a set of file system Network Shared Disk information indicating a set of Network Shared Disks associated with a particular file system; and
   a file system access indicator indicating a set of Network Shared Disk servers that are to be used when accessing a particular file system.

13. A computer program storage product for accessing data on an information processing system, the information processing system including a plurality of Network Shared Disk servers and at least one set of Network Shared Disks, and each of the Network Shared Disks being served by at least one of the Network Shared Disk servers, the computer program storage product comprising instructions for:
   analyzing a set of file system configuration data that includes information indicating which of the Network Shared Disk servers serve each of the Network Shared Disks;
   identifying which one of the Network Shared Disks is to be accessed;
   selecting one of the Network Shared Disk servers from the plurality of Network Shared Disk servers that serve the one Network Shared Disk to be accessed; and
   accessing the one Network Shared Disk to be accessed via the one Network Shared Disk server that was selected.

14. The computer program storage product of claim 13, wherein the instructions for selecting for comprise instructions for:
   determining a subnet that a client is on;
   determining, from the set of file system configuration data, which of the Network Shared Disk servers are on the subnet; and
   selecting one of the Network Shared Disk servers from the Network Shared Disk servers that are determined to be on the subnet.

15. The computer program storage product of claim 13, wherein the instructions for selecting further comprising instructions for:
   using priority ranking of the Network Shared Disk servers to select one of the Network Shared Disk servers from the plurality of Network Shared Disk servers that serve the one Network Shared Disk to be accessed.

16. The computer program storage product of claim 13, further comprising instructions for:
   determining if the one Network Shared Disk server that was selected has failed or an I/O transaction has failed; and
   if it is determined that the one Network Shared Disk server that was selected has failed or an I/O transaction has failed, selecting another of the Network Shared Disk servers from the plurality of Network Shared Disk servers that serve the one Network Shared Disk to be accessed using the priority ranking.

17. The computer program storage product of claim 13, further comprising instructions for:
   determining if a new Network Shared Disk server has joined the information processing system; and
   if it is determined that a new Network Shared Disk server has joined the information processing system, repeating the selecting step.

18. The computer program storage product of claim 13, wherein the Network Shared Disk servers reside within a General Parallel File System.

19. The computer program storage product of claim 13, wherein the set of file system configuration data further includes at least one of:
   a subnet address for each of the Network Shared Disk servers;
   a set of file system Network Shared Disk information indicating a set of Network Shared Disks associated with a particular file system; and
   a file system access indicator indicating a set of Network Shared Disk servers that are to be used when accessing a particular file system.

* * * * *